United States Patent [19]

Miller

[11] Patent Number: 4,905,433
[45] Date of Patent: Mar. 6, 1990

[54] HOSPITAL HEAD WALL SYSTEM

[75] Inventor: David H. Miller, Walnut Creek, Calif.

[73] Assignee: Hospital Systems, Inc., Oakland, Calif.

[21] Appl. No.: 237,443

[22] Filed: Aug. 29, 1988

[51] Int. Cl.$^4$ .............................................. E04B 5/48
[52] U.S. Cl. ....................................... 52/221; 52/287; 174/48; 362/130; 362/147
[58] Field of Search ................ 52/221, 220, 242, 287; 362/130, 147; 174/48

[56] References Cited

U.S. PATENT DOCUMENTS

| | | | |
|---|---|---|---|
| 2,998,508 | 8/1961 | Bobrick | 174/48 X |
| 3,084,247 | 4/1963 | Bobrick | 362/801 X |
| 3,461,349 | 8/1969 | Meyer | 174/48 X |
| 3,462,892 | 8/1969 | Meyer | 52/221 X |
| 3,692,920 | 9/1972 | Santarelli | 174/48 |
| 3,697,667 | 10/1972 | Pollak et al. | 52/221 X |
| 3,699,235 | 10/1972 | Wasson et al. | 174/48 |
| 4,032,821 | 6/1977 | Keiser | 174/48 X |
| 4,338,485 | 7/1982 | Fullenkump et al. | 174/48 |
| 4,452,499 | 6/1984 | Verburg | 52/221 X |
| 4,680,684 | 7/1987 | Wolber | 362/130 X |

Primary Examiner—Henry E. Raduazo
Assistant Examiner—Creighton Smith
Attorney, Agent, or Firm—Julian Caplan

[57] ABSTRACT

One or more horizontally disposed, vertically spaced raceways have passageways for medical gases and electrical wiring which may communicate with a vertical chase at the ends of the raceways which contain conduits for such gases and wiring. The gases are piped inside a compartment at the top of the raceway and then by branch pipes to outlets on the front or the bottom of the raceway. Wiring of different voltages are contained in vertically spaced passageways in the back of the raceway and are electrically connected to socket outlets at convenient intervals on the front. Vertical separators isolate the various voltage wires from each other. Detachable covers provide access to the various compartments. Rails are formed on the exterior so that auxiliary eqipment may be clamped thereto at desired intervals.

14 Claims, 3 Drawing Sheets

HOSPITAL HEAD WALL SYSTEM

FIELD OF THE INVENTION

This invention relates to a new and improved hospital headwall system. More particularly, the invention relates to horizontal raceways and/or vertical chases in which medical gas conduits and electrical wiring are housed and concealed with provision for connection to outlets on the front or bottom of the raceways in the form of sockets and the like to which accessories, hoses and wires may be attached.

DESCRIPTION OF RELATED ART

Hospital headwalls are well known in the industry. Such devices are installed behind nursing beds and intensive care beds and have outlets quite similar to those of the present invention. For example a typical wall mounted hospital bed light fixture and service console combination is shown in U.S. Pat. No. 3,084,247. The present invention constitutes a considerable improvement over prior structures as hereinafter appears.

SUMMARY OF THE INVENTION

The modular headwall hereinafter described has considerable flexibility in the placement of mechanical, medical gas, electrical and ancillary equipment and outlets. The headwall permits re-configuration of a hospital room by for example conversion from a single to a double bed room (or vice versa) or conversion from a nursing unit to an acute care unit. Thus all accessories may be relocated or added within a very short time.

A feature of the invention is the fact that it is much simpler to install in that there are fewer parts to assemble and less on-site piping is required.

The headwall may be adapted to new nursing technologies as they are developed and to expansion of existing facilities.

The present invention provides a combination of one or more vertical chases to which are attached horizontal raceways. It will be understood that in some instances the raceways may be used without the chases.

Several vertically spaced apart horizontal raceways may be used. For example the top raceway may contain an overhead patient light assembly and other facilities such as, for example, a digital clock or timer and one or more electrical outlets.

The middle raceway may contain wiring for different voltage electric currents and for an emergency power outlet, outlets for various medical gases (e.g. compressed air, oxygen and a vacuum line). Further the middle raceway is large enough in capacity so that even a nurse call facility and/or a digital clock may be installed because the vertical dimensions of the raceway will accommodate the same.

The bottom raceway may have attached thereto a bed bumper which is used to center and/or otherwise locate one or more hospital beds as well as some or all of the equipment attached to the middle raceway.

The vertical chase houses piping and conduits for the station on which the particular headwall is located as well as piping and conduits leading from the basement or another location in the hospital to other floors of the building.

One feature of the invention is the fact that the raceway is provided with snap-in compartments which separate wiring of different voltages, slide-in dividers and the like. The cover of the raceway is preferably curved to discourage placing objects thereon.

Other features of the invention will become apparent upon reading the following specification and referring to the accompanying drawings in which similar characters of reference represent corresponding parts in each of the several views.

IN THE DRAWINGS

Figure 1:
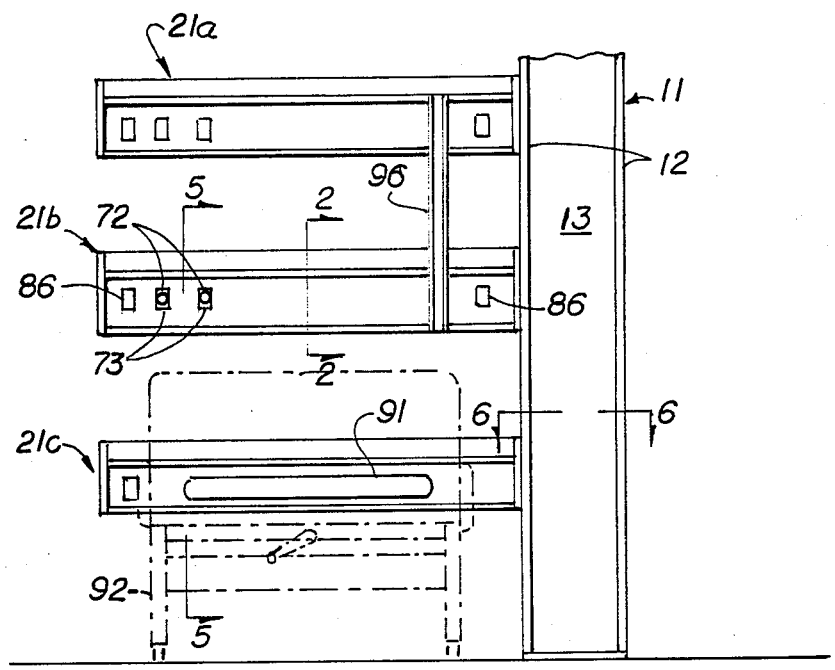
FIG. 1 is a front elevational view of one form of the present invention showing in dot-and-dash lines the location of a single bed used therewith.
Figure 2:
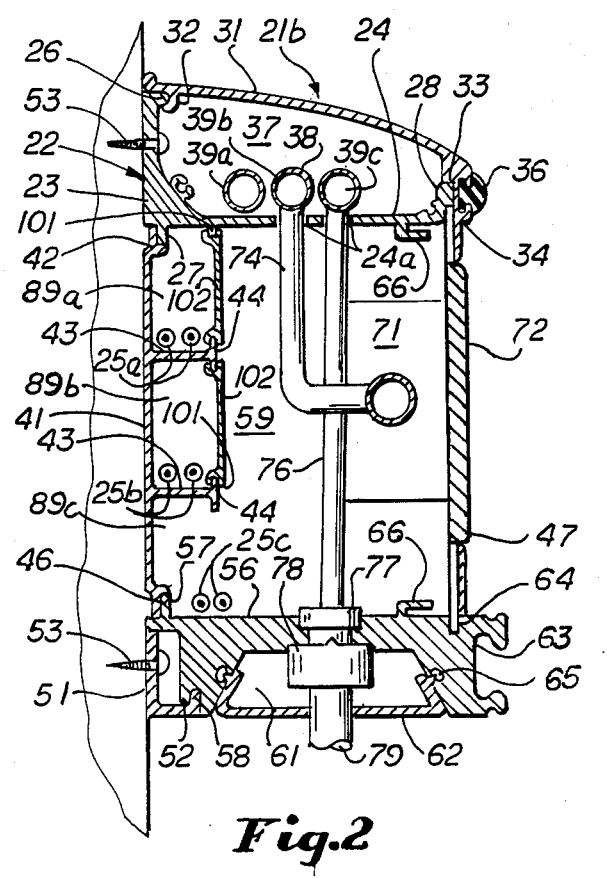

FIG. 2 an enlarged vertical sectional view taken substantially along the line 2—2 of FIG. 1.

Figure 3:
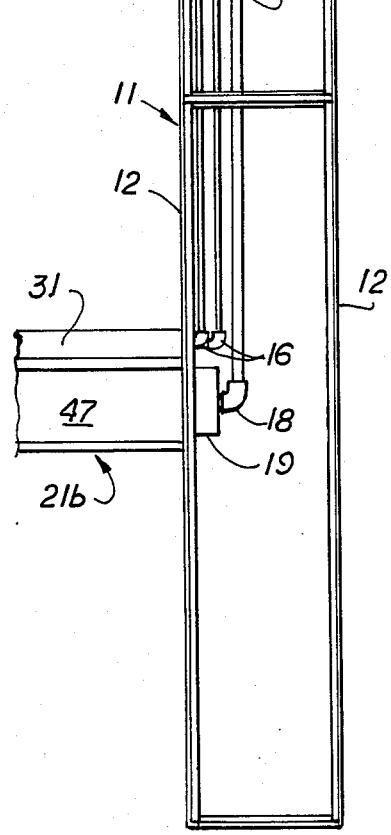

FIG. 3 is a front elevational view of a chase and a portion of a raceway with the front cover of the chase removed to reveal internal construction.

Figure 1A:
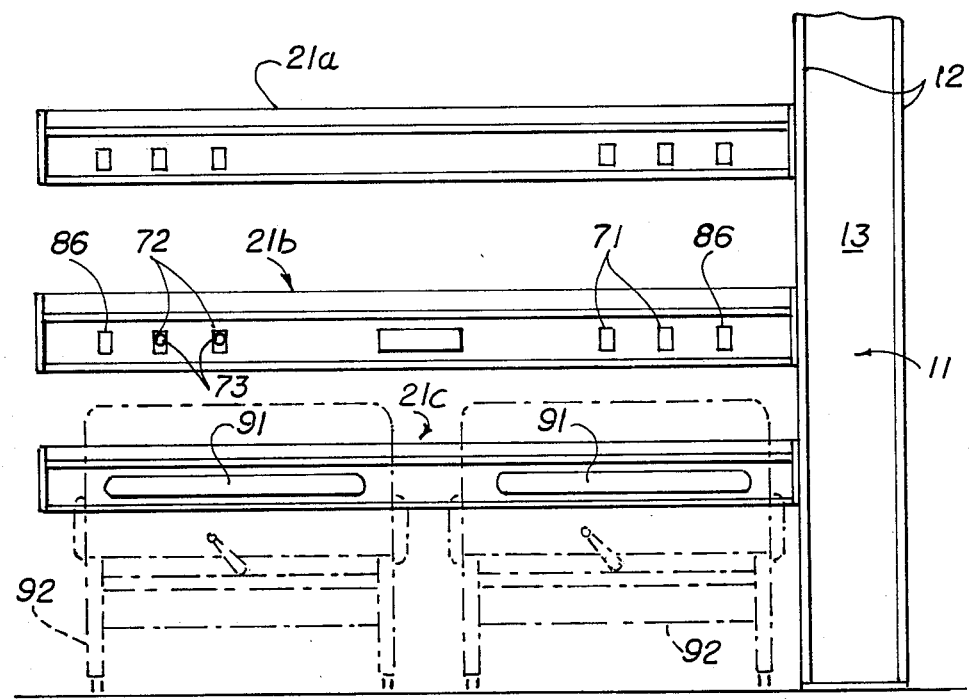
FIG. 1A is a view similar to FIG. 1 showing two beds serviced by a single chase.
Figure 1B:
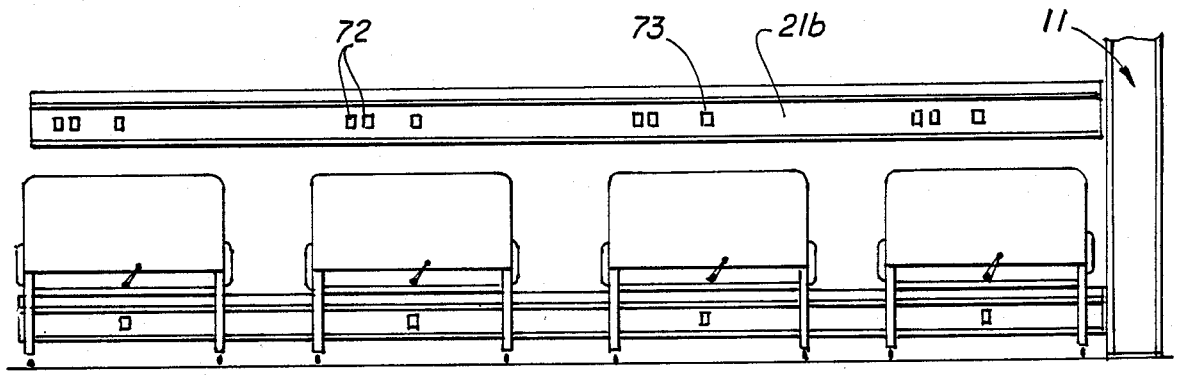
FIG. 1B is a view similar to FIG. 1A showing ward usage with multiple beds serviced by continuous raceways attached to a single chase.
Figure 1C:
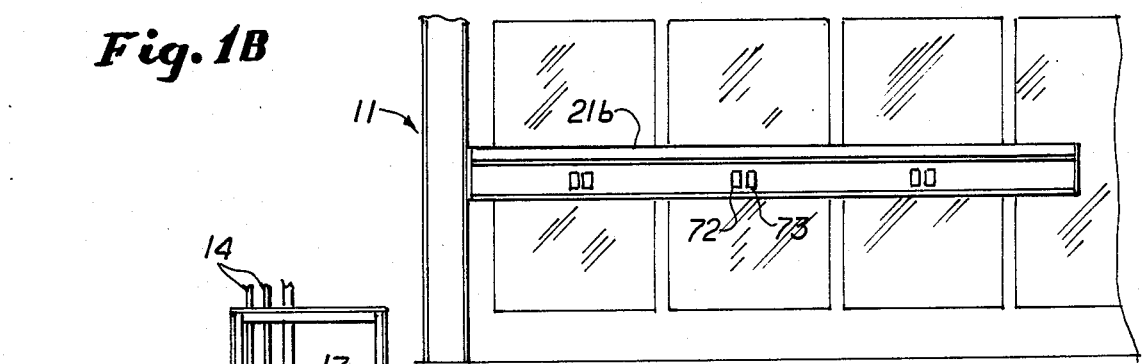
FIG. 1C shows attachment of a raceway to window mullions.
Figures 1D, 4:
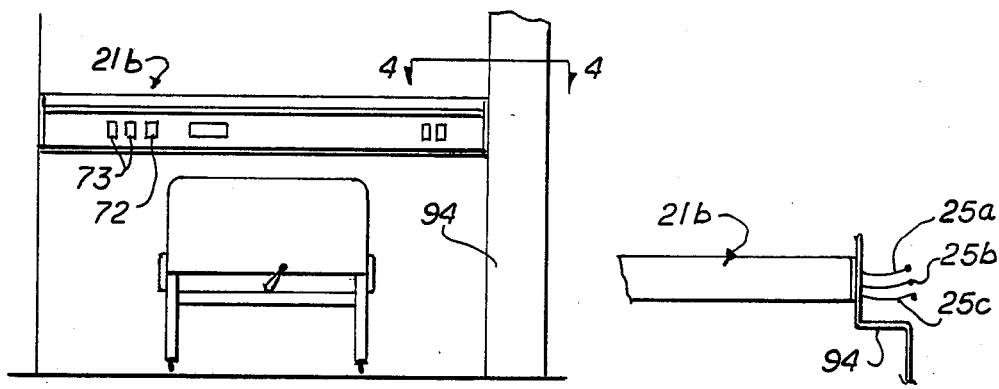
FIG. 1D is a view similar to FIG. 1A showing elimination of the use of a chase.

FIG. 4 is a fragmentary sectional view taken substantially along the line 4—4 of FIG. 1D.

Figure 5:
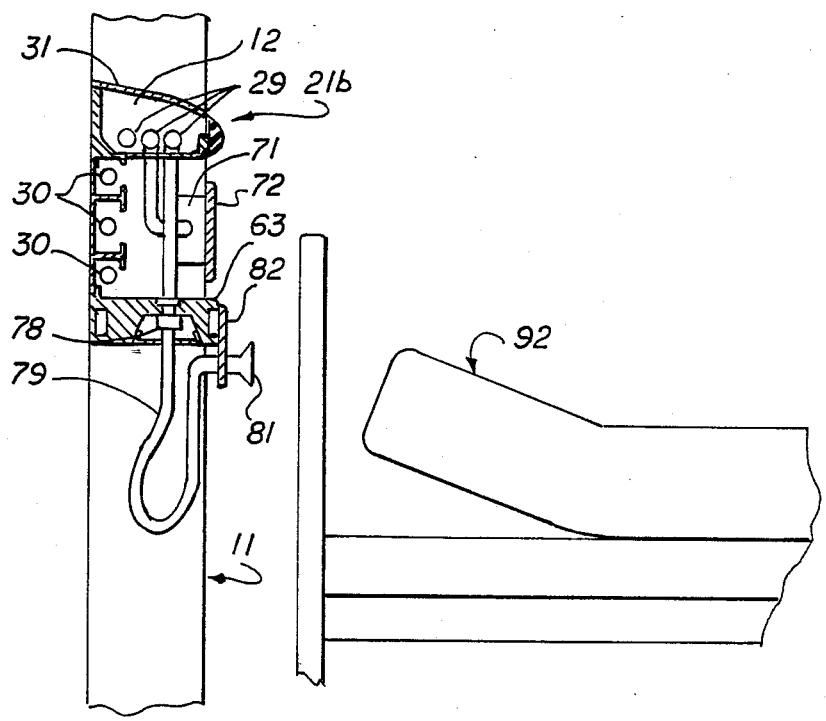

FIG. 5 is an enlarged sectional view somewhat schematic in form taken substantially along the line 5—5 of FIG. 1.

Figure 6:
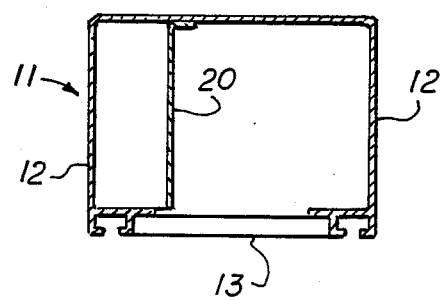

FIG. 6 is a horizontal sectional view taken substantially along the line 6—6 of FIG. 1.

DESCRIPTION OF PREFERRED EMBODIMENTS

Chase 11 is vertically disposed alongside one portion of a hospital wall and is provided with sides 12 which are enclosed by a removable front cover 13. Removal of the cover provides access to the interior of chase 11 in which are installed vertical pipes 14 for medical gases—the most common being compressed air, oxygen and a vacuum line. Opposite the raceway in which the particular pipe is to be connected are fittings such as elbows 16 or tees to which horizontally disposed pipes 39a, b, c are connected. Also within the chase 11 are vertically disposed electrical conduits 17 also provided with fittings such as elbows or tees 18 leading to a junction box 19 on the left-hand side 12. The medical gas pipes 14 and electrical conduits 17 are separated by a vertical partition 20. Holes 29 and 30, respectively, are formed in partition 20 and side 12 for passage of the horizontal pipes 39a, b, c and horizontal electrical cables 25a, b, c which are vertically spaced apart. Conduits 17 may carry, for example, high voltage, low voltage and emergency power.

Raceways 21 are preferably bolted or otherwise connected to chase 11 but, as is best shown in FIGS. 1C and 1D, the raceways need not be connected to a chase 11.

In FIG. 1 there are shown, proceeding from top to bottom, raceways 21a, 21b and 21c. As best shown in FIG. 2, the raceway 21b has a top extrusion 22 provided with a back 23 which is attached to the hospital wall and a bottom 24 proceeding outwardly therefrom. At the upper end of extrusion 22 is a top projection 26 and at the bottom thereof are a pair of bottom projections 27. At the front edge of bottom 24 is a front upward-forward projection 28. It will be noted that the elevation of projection 26 is greater than that of projection 28 and thus the top cover 31 curves forwardly downwardly. The rear edge of cover 31 has a top receptor 32 into which the projection 26 snaps and the forward lower edge of cover 31 has a front receptor 33 which receives projection 28. Thus the top cover 31 is readily removed and replaced since it snaps into place. At the same time it will be observed that there is no horizontal surface on which an object may be placed which otherwise might create a hazard to the patient. Along the front edge of cover 31 is a horizontally disposed channel 34 into which a decorative molding 36 may be snapped. The molding 36 conceals screws which attach the members 31, 34 and 28 together. At either end of the raceway 21b is an end wall 37 in which are knockouts which may be punched out to provide holes 38 through which pipes 39a, 39b and 39c extend to their connections with the various elbows or tees 16 in chase 11.

Below the upper compartment of raceway 21b is an intermediate compartment formed with a back 41 which is an extrusion and which fits against the room wall. Back 41 has a top receptor 42 which receives bottom projection 27 of top extrusion 22. Forward extending shelves 43 are formed with ledges 44. Bottom receptor 46 is formed on the bottom edge of back 41. A front panel 47, preferably of a decorative nature, closes off the front of the area below the bottom 24 of extrusion 22. The contents and connections of the elements housed inside the front cover 47 are hereinafter described.

Below back extrusion 41 is a wall hanger 51 here shown as L-shaped with an upturned hook 52 on its forward edge. Screws 53 attach the hanger 51 to the wall and upper screws 53 attach the top extrusion 22 to the wall.

Bottom extrusion 56 has a top projection 57 at its rearward edge which is received by the bottom receptor 46. The extrusion 56 also has a bottom receptor 58 which receives the hook 52. Thus the extrusion 56 provides a flooring for the compartment inside front panel 47.

In a preferred form of the invention shown in FIG. 2 there is a recess 61 formed in the bottom of extrusion 56. The recess is preferably closed off with a bottom cover 62 which snaps into appropriate grooves 65.

On the forward edge of extrusion 56 is a front rail 63 to which various accessories may be clamped as well understood in this art. The extrusion 56 is also formed with a horizontally extending slot 64 which receives the bottom edge of panel 47.

At intervals, within compartment 59 may be installed outlet boxes 71 for various medical gases. As shown in FIG. 2, the box 71 is connected by means of pipe 74 through holes 24a and 38 to one of the fittings 16. Opposite the exterior of box 71 front panel 47 is cut away so that a gas connector 73 may be installed therein. Boxes 71 may also be connected to various cables 25 and provide sockets for electric plugs (not shown) for a variety of electric appliances.

Instead of the medical gas terminating in the front panel 47, as also shown in FIG. 2, pipe 76 may be dropped down through the compartment 59 and through a hole in bottom extrusion 56. The lower end of pipe 76 is threaded as indicated by reference numeral 77 and a coupler 78 connected thereto. A flexible conduit 79 may be connected to the coupler 78. Assuming that for example the pipe 76 is attached to a vacuum line, as shown in FIG. 5, the flexible conduit 79 may be of extended length and have on its distal end a movable connection 81 which is attached by hanger 82 to rail 63 or other convenient location.

As shown in FIG. 2 there are three electrical compartments 89a, 89b and 89c located within the compartment 59. These compartments may or may not be closed off with covers. Electrical wiring 25a, 25b, 25c may be installed in each of the electrical compartments 89 and attached to junction boxes 19 and thus to the electrical cables 25 within the conduit 17 in chase 11. Thus in 89a may be installed high voltage electric current 25a, lower voltage wiring 25b in 89b and emergency wiring in 89c.

Projections 101 may be formed on bottom 24, shelves 43 and bottom extrusion 56. If a cover plate 102 is to be used for any compartment 89, it may have on its top and bottom edges hook-like receptors 103 which snap over projections 102 to hold cover plate 102 in place.

It will be understood that nursing call station equipment, night lights, digital clocks, telephone wiring and many other connections may be installed within compartment 59 or wiring compartment 89a, b, c as desired.

The lower raceway 21c shown in FIG. 1 may have attached thereto a bumper pad 91, which assists the orderly in positioning the hospital bed 92 and also provides protection from the bed hitting the wall. The raceway 21c may contain some or all of the facilities which are contained within raceway 21b but ordinarily would contain only 110 volt current.

FIG. 1A shows how raceways 21b and 21c may be of greater length than those shown in FIG. 1 so that two beds may be serviced by a single set of raceways. The bumper pads 91 assist the orderly, nurse or other attendant in locating the beds 92 in their proper position and also in protecting the wall against damage by the bed 92 bumping the same.

FIG. 1B shows how a single set of raceways may be used to service a group of beds in a ward from a single chase 11.

FIG. 1C shows how the raceway 21b may be attached to window mullions and the services may be brought in through the end of the raceway without the use of a chase.

Similarly, in FIG. 1D the raceway 21b does not require the use of a chase in that the medical gas and power are dropped into the raceway from the furring 94, in the corner of the room.

What is claimed is:
1. A headwall horizontal raceway adapted to fit along a wall comprising
first compartment-forming means forming a first compartment, said first compartment-forming means comprising a vertical back, a horizontal first compartment bottom perpendicular to said first compartment back, a detachable first cover for said first compartment, first attachment means for securing said first compartment back to said wall,
second compartment-forming means below said first compartment-forming means forming a second compartment, said second compartment-forming means comprising a vertical second compartment back, a plurality of shelves extending horizontally forward from said second compartment back, each said shelf dimensioned to support at least one electric cable and space said cable from cables on other shelves, a detachable substantially vertical second cover closing off the forward end of said second compartment-forming means, at least one electric service outlet fastened to said second cover and connected to one said electric cable, a horizontal second compartment bottom separate from said second compartment back and said second cover closing off the bottom of said second compartment, second attachment means for securing said second compartment bottom to said wall, at least one medical gas service outlet passing vertically through said second compartment bottom and adapted for attachment of a hose to the outer end of said medical gas service outlet exterior to said second compartment, a plurality of horizontal pipes for medical gases in said first compartment, at least one said pipe extending down through said first compartment bottom into said second compartment and attached to the inner end of said medical gas service outlet.

2. A raceway according to claim 1 in which said second attachment means comprises an L-shaped wall hanger having a horizontal and a vertical leg, said vertical leg being attached to said wall, said second compartment bottom being formed with a receptor to receive said horizontal leg.

3. A raceway according to claim 2 which further comprises a second medical gas service outlet fastened to said second cover, one said pipe extending down through said first compartment bottom into said second compartment and being attached to said second medical gas service outlet interiorly of said second compartment.

4. A raceway according to claim 1 in which said second compartment bottom is formed on its underside with a longitudinal recess and said medical gas service outlet is in said recess.

5. A raceway according to claim 4 which has a bottom cover closing off said recess.

6. A raceway according to claim 1 which further comprises a flexible tube connected at its proximal end to said medical gas service outlet, a movable connector on the distal end of said tube and a hanger on said distal end of said tube to hang said movable connector on said raceway.

7. A raceway according to claim 6 in which said second compartment bottom has a front face formed with a horizontal rail, said hanger being slidable along said rail.

8. A raceway according to claim 4 in which said first cover curves downward-outward and which further comprises cooperating, detachable, snap-in means on edges of said first cover and said first compartment-forming means to hold said first cover in place.

9. A raceway according to claim 1 in which said second compartment bottom further comprises an additional shelf for at least one electric cable in addition to said cables supported by said first-mentioned plurality of shelves and located below said first-mentioned plurality of shelves.

10. A raceway according to claim 1 in which said second compartment back and said shelves comprises a single longitudinally extending extrusion.

11. A headwall according to claim 2 in which the upper edge of said second compartment back engages and is held in place by said first compartment forming means and the lower edge of said second compartment back engages and is held in place by said second compartment bottom.

12. A headwall according to claim 11 in which the upper edge of said second cover is engaged by and held in place by said first cover and said first compartment bottom and the lower edge of said second cover is engaged by and held in place by said second compartment bottom.

13. A raceway according to claim 1 in which said shelves extend only partly outward relative to said first and second compartment bottoms.

14. A raceway according to claim 1 which further comprises a cover plate on the forward edge of each said shelf closing off the area above said shelf and below the adjacent horizontal member above said shelf and means for detachably securing said cover plate and shelf together.

* * * * *